US011340818B2

(12) United States Patent
Ashkadov et al.

(10) Patent No.: US 11,340,818 B2
(45) Date of Patent: May 24, 2022

(54) MIGRATING VIRTUAL TAPES BETWEEN DIFFERENT VIRTUAL TAPE STORAGES WITHOUT HOST INVOLVEMENT

(71) Applicant: EMC IP Holding Company LLC, Hopkinton, MA (US)

(72) Inventors: Dmitry Ashkadov, Murino (RU); Yuri Kotov, Saint Petersburg (RU); Vladislav Alekseev, Saint Petersburg (RU)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/523,318

(22) Filed: Jul. 26, 2019

(65) Prior Publication Data

US 2021/0026552 A1 Jan. 28, 2021

(51) Int. Cl.
*G06F 3/06* (2006.01)
(52) U.S. Cl.
CPC .......... *G06F 3/0647* (2013.01); *G06F 3/0604* (2013.01); *G06F 3/0659* (2013.01); *G06F 3/0686* (2013.01)
(58) Field of Classification Search
None
See application file for complete search history.

(56) References Cited

U.S. PATENT DOCUMENTS

| 9,733,871 | B1* | 8/2017 | Burgoyne | ............. G06F 3/0619 |
| 2011/0004727 | A1* | 1/2011 | Bitner | ................... G06F 3/0664 |
| | | | | 711/111 |

* cited by examiner

*Primary Examiner* — Brian R Peugh
(74) *Attorney, Agent, or Firm* — Amin, Turocy & Watson, LLP

(57) ABSTRACT

Migrating virtual tapes between different virtual tape storages without host involvement is described herein. A system as described herein can include a local tape library comprising respective storage devices; a memory that stores executable components; and a processor that executes the executable components stored in the memory. The executable components can comprise a connection component that establishes a first connection to a host system and a second connection to an external tape library; a request processing component that receives an access request for a requested storage device from the host system via the first connection; and a proxy component that accesses the requested storage device at the outside tape library via the second connection and enables access to the requested storage device by the host system via the first connection in response to the requested storage device being determined to be absent from the local tape library.

20 Claims, 11 Drawing Sheets

US 11,340,818 B2

MIGRATING VIRTUAL TAPES BETWEEN DIFFERENT VIRTUAL TAPE STORAGES WITHOUT HOST INVOLVEMENT

TECHNICAL FIELD

The subject application is related to data storage systems, and more particularly, to techniques for migrating data between data storage systems.

BACKGROUND

Large-scale computing systems, such as mainframe systems or the like, often utilize tape libraries or virtual tape libraries for data storage and backup due to the magnitude of data that can be stored on such libraries. A tape library can store data on magnetic tapes that can be physically connected to a host system, while a virtual tape library can utilize tape drives or other devices that function in a similar manner to magnetic tapes. In both tape libraries and virtual tape libraries, it is desirable to implement techniques that improve access speed and ease of use, particularly in cases involving upgrading a tape library or otherwise changing from one tape library to another.

SUMMARY

The following summary is a general overview of various embodiments disclosed herein and is not intended to be exhaustive or limiting upon the disclosed embodiments. Embodiments are better understood upon consideration of the detailed description below in conjunction with the accompanying drawings and claims.

In an aspect, a system is described herein. The system includes a local tape library that includes respective storage devices, a memory that stores executable components, and a processor that executes the executable components stored in the memory. The executable components can include a connection component that establishes a first connection to a host system and a second connection to an external tape library, a request processing component that receives an access request for a requested storage device from the host system via the first connection, and a proxy component that accesses the requested storage device at the outside tape library via the second connection and enables access to the requested storage device by the host system via the first connection in response to the requested storage device being determined to be absent from the local tape library.

In another aspect, a method is described herein. The method can include facilitating, by a device operatively coupled to a processor and a first tape library, establishing a first connection from a host system to the first tape library; facilitating, by the device, establishing a second connection from the first tape library to a second tape library, where the second tape library is distinct from the device; receiving, by the device, an access request for a target storage device from the host system via the first connection; and, in response to the target storage device being determined to be absent from the first tape library, accessing, by the device, the target storage device at the second tape library via the second connection and providing, by the device, access to the target storage device by the host system via the first connection.

In an additional aspect, a machine-readable medium including executable instructions is described herein. The instructions, when executed by a processor of a data storage system, can facilitate performance of operations including establishing a first connection from a mainframe system to a local tape library and a second connection from the local tape library to an external tape library, receiving a request for access to a requested storage device from the mainframe system via the first connection, and in response to the requested storage device being determined to be absent from the local tape library, accessing the requested storage device at the second tape library via the second connection and facilitating access to the requested storage device by the host system via the first connection.

DESCRIPTION OF DRAWINGS

Various non-limiting embodiments of the subject disclosure are described with reference to the following figures, wherein like reference numerals refer to like parts throughout unless otherwise specified.

DETAILED DESCRIPTION

Various specific details of the disclosed embodiments are provided in the description below. One skilled in the art will recognize, however, that the techniques described herein can in some cases be practiced without one or more of the specific details, or with other methods, components, materials, etc. In other instances, well-known structures, materials, or operations are not shown or described in detail to avoid obscuring certain aspects.

Figure 1:
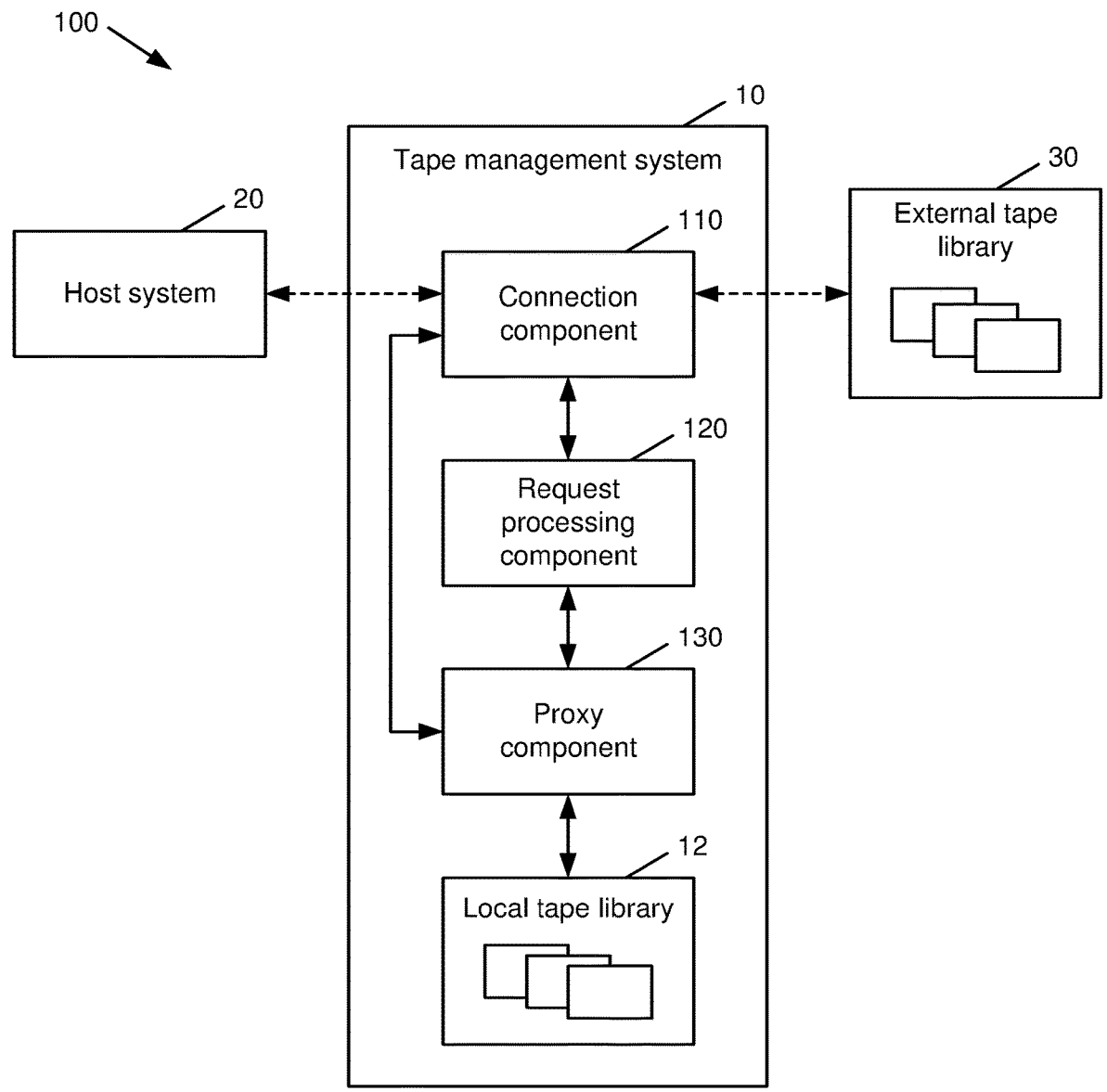
FIG. 1 is a block diagram of a system that facilitates migration of data between virtual tape storage systems without host involvement in accordance with various aspects described herein.

With reference to the drawings, FIG. 1 illustrates a system 100 that facilitates migration of data between virtual tape storage systems without host involvement in accordance with various aspects described herein. As shown in FIG. 1, system 100 includes a tape management system 10, also referred to herein as a local tape management system. The tape management system 10 includes a local tape library 12 that is composed of respective storage devices. In one example, the local tape library 12 can include respective physical storage tapes, such as magnetic tape reels, cassettes, cartridges, or the like. In other examples, the local tape library 12 can include virtual tape storage, such as hard drives and/or other storage devices that are presented to the tape management system 10 as physical tapes. In still other examples, the local tape library 12 can include a combination of both physical and virtual tape storage. For instance, the local tape library 12 can include virtual tape drives and/or other virtual tape storage that can be periodically recorded onto physical tapes to enhance backup and/or disaster recovery functionality of the local tape library 12. Still other implementations are possible.

As further shown by FIG. 1, the tape management system 10 includes a connection component 110 that can establish a first connection to a host system 20 (e.g., a mainframe system, etc.) and a second connection to an external (outside) tape library 30 that is distinct from the local tape library 12 and the tape management system 10. In an aspect, the external tape library 30 can include physical and/or virtual tape storage in a similar manner to the local tape library 12. In an aspect, the first connection from the host system 20 to the tape management system 10 and the second connection between the tape management system 10 and the external tape library 30 can utilize a same communication protocol or different communication protocols.

The tape management system 10 shown in FIG. 1 further includes a request processing component 120 that can receive an access request for a requested storage device, e.g., a physical tape or virtual tape, from the host system 20 over the first connection from the host system 20 to the tape management system 10. The tape management system 10 further includes a proxy component 130 that can access the storage device requested by the host system 20 at the external tape library 30 via the second connection from the tape management system 10 to the external tape library 30 and enable access to the requested storage device by the host system 20 over the first connection from the host system 20 to the tape management system 10 in response to the requested storage device being absent from the local tape library 12. In other words, upon receiving a request to access a storage device from the host system 20, the tape management system 10 can determine whether that device is present at the local tape library 12. If said device is not present at the local tape library 12, the proxy component 130 can act as a proxy for the request to the external tape library 30.

In an aspect, the tape management system 10 can be implemented in connection with an enterprise storage solution for computing systems that utilize tape drives and/or tape libraries. As noted above, the tape management system 10 can provide a tape library solution that can emulate a set of tape drives and/or virtualize a set of tape libraries. As opposed to a physical tape library in which requested tapes are physically attached to a system for file access, a virtual tape library can provide solutions to store and access data on different types of storage devices, e.g., by storing data on hard drives and/or other storage devices that can be accessed according to various techniques for storage device access as known in the art without the physical attachment of media to a system. For instance, connections between the tape management system 10, the host system 20, and/or the external tape library 30 can utilize a communication protocol such as the ANSI FC-SB-3 Single-Byte Command Code Sets-3 Mapping Protocol for Fibre Channel (FC) protocol, also known as the FICON (Fibre Connection) protocol. In an aspect, this protocol and/or other protocols can be utilized by the connection component 110 shown in system 100 for a first connection between the tape management system 10 and the host system 20, a second connection between the tape management system 10 and the external tape library 30, and/or other connections from the tape management system 10 to other computing devices or systems as appropriate.

In the event that a mainframe operator and/or other computing system operator wishes to switch from an existing tape management solution to a new solution (e.g., due to switching from a solution provided by one vendor to a solution provided by another vendor, upgrading a solution provided by a given vendor to a newer version, etc.), data stored on any tapes or other devices of the existing tape library are desirably migrated to the new solution.

Figure 2:
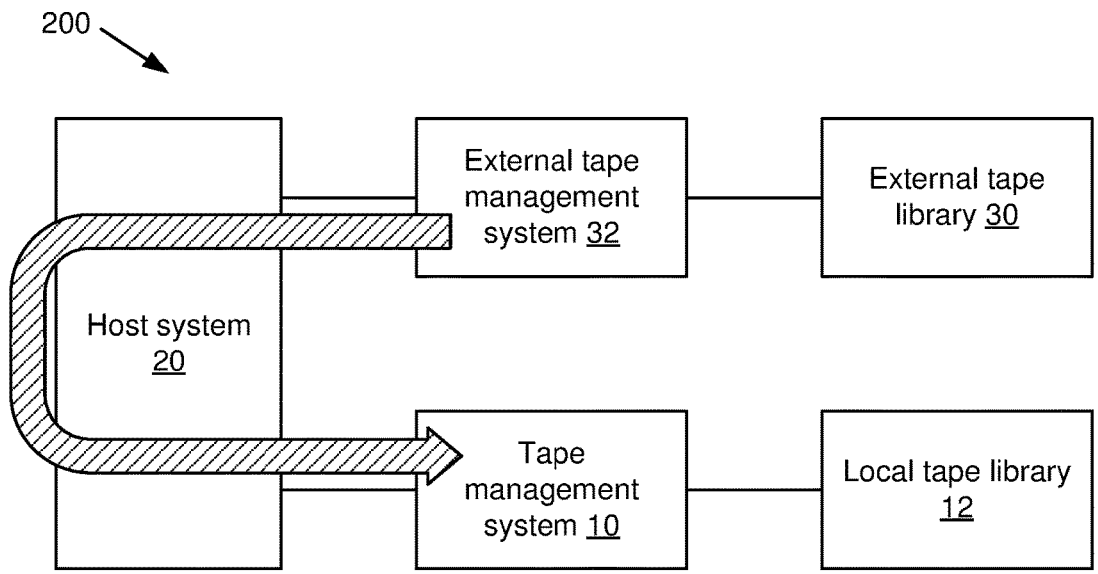
FIGS. 2-3 are diagrams depicting example data flows between a host system and respective tape management systems in accordance with various aspects described herein.

An example of migration from an external tape management system 32 associated with the external tape library 30 to the tape management system 10 associated with the local tape library 12 is shown by diagram 200 in FIG. 2. Here, a host-based solution is used, in which both the external tape management system 32 and the tape management system 10 are attached to the host system 20 and a migration task and/or workload is executed on the host system 20 in order to individually read tapes from the external tape library 30 and store said tapes on the local tape library 12. However, this host-based migration technique can present various disadvantages that can make migration between different tape management systems undesirable.

For instance, a migration plan as shown by diagram 200 is generally prepared and executed manually by a system operator, which can be a complex and time-consuming process involving reconfiguration of the host system 20 among other tasks. Further, such a migration technique can result in significant time windows in which resources of the host system 20 are dedicated to data transfer and unavailable to other tasks. In various circumstances, this can lead to adverse effects on the performance of the host system 20 that can be as severe as complete downtime of the host system 20 for the duration of the migration procedure. Further, tapes that are being migrated can in some circumstances be inaccessible during migration. Transfer of large amounts of data to and from the host system 20 in connection with a migration procedure as shown by diagram 200 can also cause additional load to network switches and/or other system infrastructure that can cause frame delivery delays and/or other degraded input/output performance.

In contrast to the migration procedure shown by diagram 200, the tape management system 10 shown in FIG. 1 can enable a system operator to connect the tape management system 10 to the host system 20 and then run a task on the tape management system 10 and/or otherwise initiate migration at the tape management system 10. An example of a migration procedure that can be performed in this manner is shown by diagram 300 in FIG. 3. As shown by diagram 300, once migration is initiated at the tape management system 10, the tape management system 10 can itself read tapes from the external tape library 30 via the tape management system 32 (e.g., via connections as established by the connection component 110) and copy those tapes to the local tape library 12 without further involvement of the host system 20. Further, while migration is occurring in the manner shown by diagram 300, both the external tape library 30 and the local tape library 12 can remain accessible to the host system 20, e.g., by the tape management system 10 proxying tape access commands between the host system 20 and the external tape library 30 via the external tape management system 32 as generally described above with respect to FIG. 1.

By facilitating connections from the tape management system 10 to the host system 20 and the external tape management system 32 and conducting data migration in the manner described above with respect to FIGS. 1 and 3, various advantages that can improve the performance of a computing system can be realized. These advantages can include, but are not limited to, the following. An amount of time associated with migration, as well as load on network switches and/or other network infrastructure associated with a computing system, can be reduced by reducing migration-related data transfers to and/or from the host system 20. Resource usage of the host system 20 (e.g., in terms of processor cycles, memory usage, communication bandwidth, power consumption, etc.) in connection with tape library migration can be significantly reduced. Data stored on the external tape library 30 and/or the local tape library 12 can be accessible even during the migration process. Automation of the development and/or implementation of a migration plan between tape libraries, including tasks not previously able to be automated, can be achieved. Overall user experience associated with changing and/or updating a tape management system can be improved. Other advantages are also possible.

Figure 3:
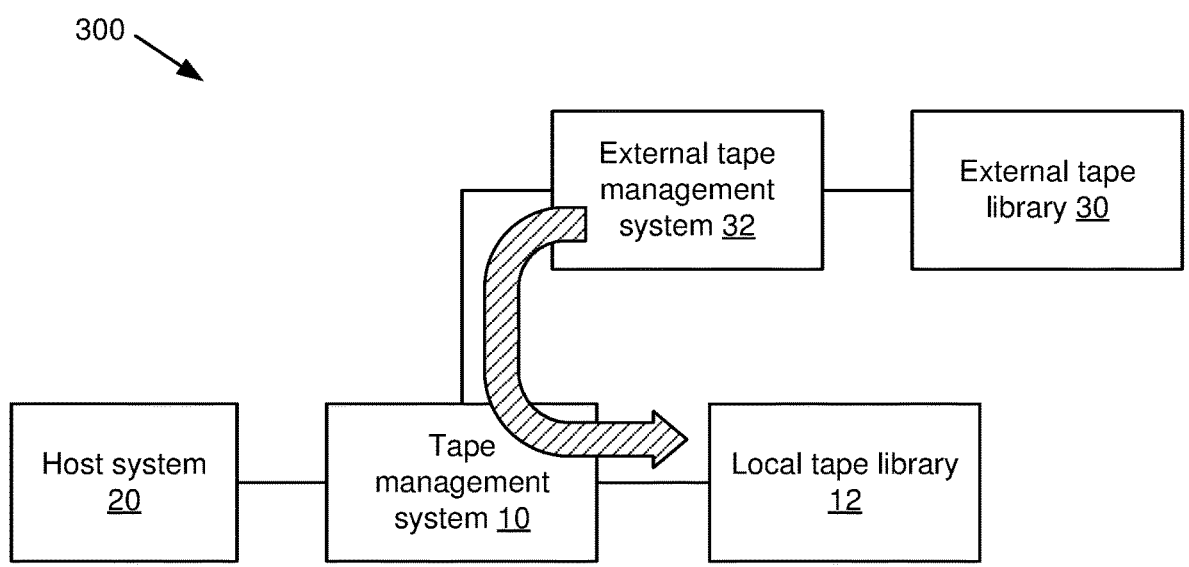

It should further be appreciated that the connecting lines shown between respective components as shown in FIGS. 2-3 represent physical connections between those components, e.g., wired connections operating according to FICON and/or other FC protocols and/or other suitable connections. Accordingly, to facilitate installation of the tape management system 10 and migration of data from the external tape management system 32 to the tape management system 10 as shown by FIG. 3, a system operator can simply disconnect the external tape management system 32 from the host system 20, connect the tape management system 10 to the host system 20 in place of the external tape management system 32, and connect the external tape management system 32 to the tape management system 10. Upon updating the connections between the respective systems in this manner, the tape management system 10 can operate to autonomously initiate migration of data to the local tape library 12 without intervention from the host system 20 according to various aspects as described herein.

Figure 4:
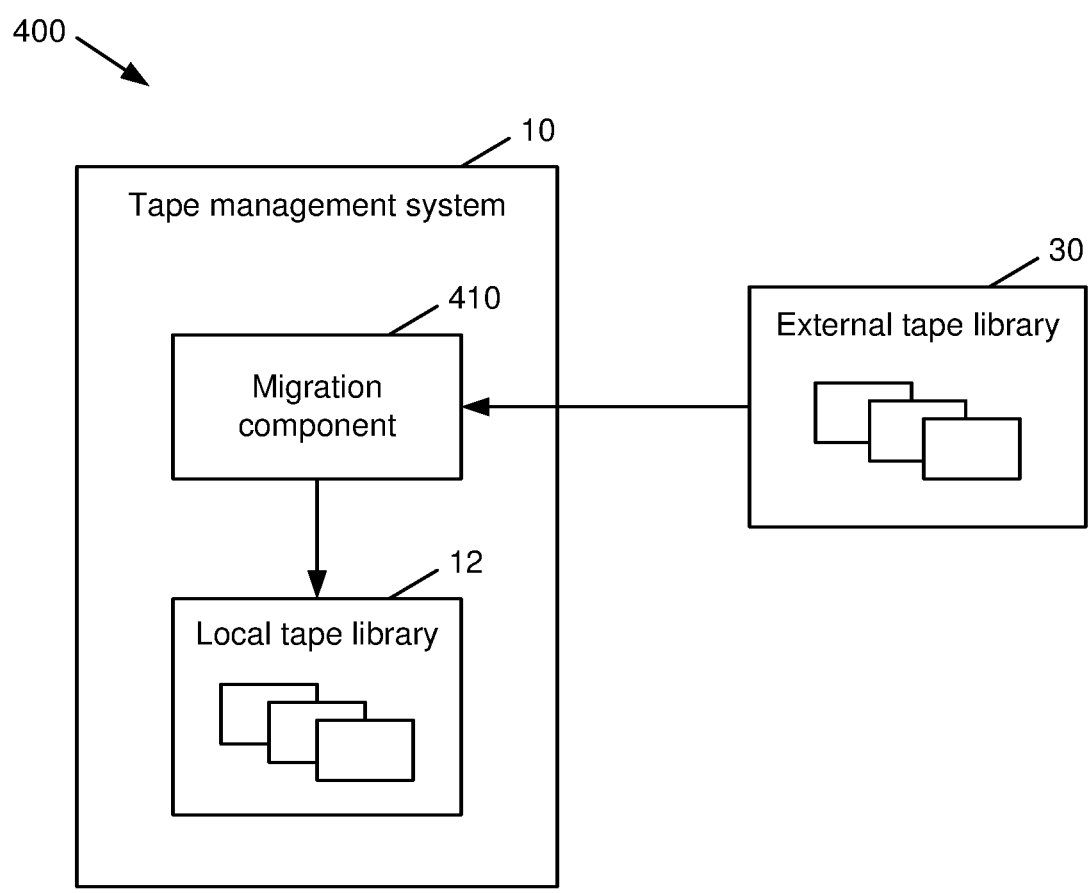
FIG. 4 is a block diagram of a system that facilitates data migration from an outside tape library to a local tape library in accordance with various aspects described herein.

Turning next to FIG. 4, a block diagram of a system 400 that facilitates data migration from an outside tape library to a local tape library in accordance with various aspects described herein is illustrated. Repetitive description of like elements employed in other embodiments described herein is omitted for brevity. As shown in FIG. 4, system 400 can include a tape management system 10 that can provide data storage via a local tape library 12 in the manner described above with respect to FIG. 1. The tape management system 10, in turn, includes a migration component 410 that can migrate data stored on respective storage devices of an external tape library 30 to respective storage devices of a local tape library 12 associated with the tape management system 10. In an aspect, the storage devices that make up the external tape library can be mapped to the local tape library 12 via the migration component 410 via any suitable mapping. For instance, a given storage device of the external tape library 30 can be mapped to the local tape library 12 according to a one-to-one, many-to-one, one-to-many, and/or other mapping as suitable for the physical implementations of the external tape library 30 and the local tape library 12.

Figure 5:
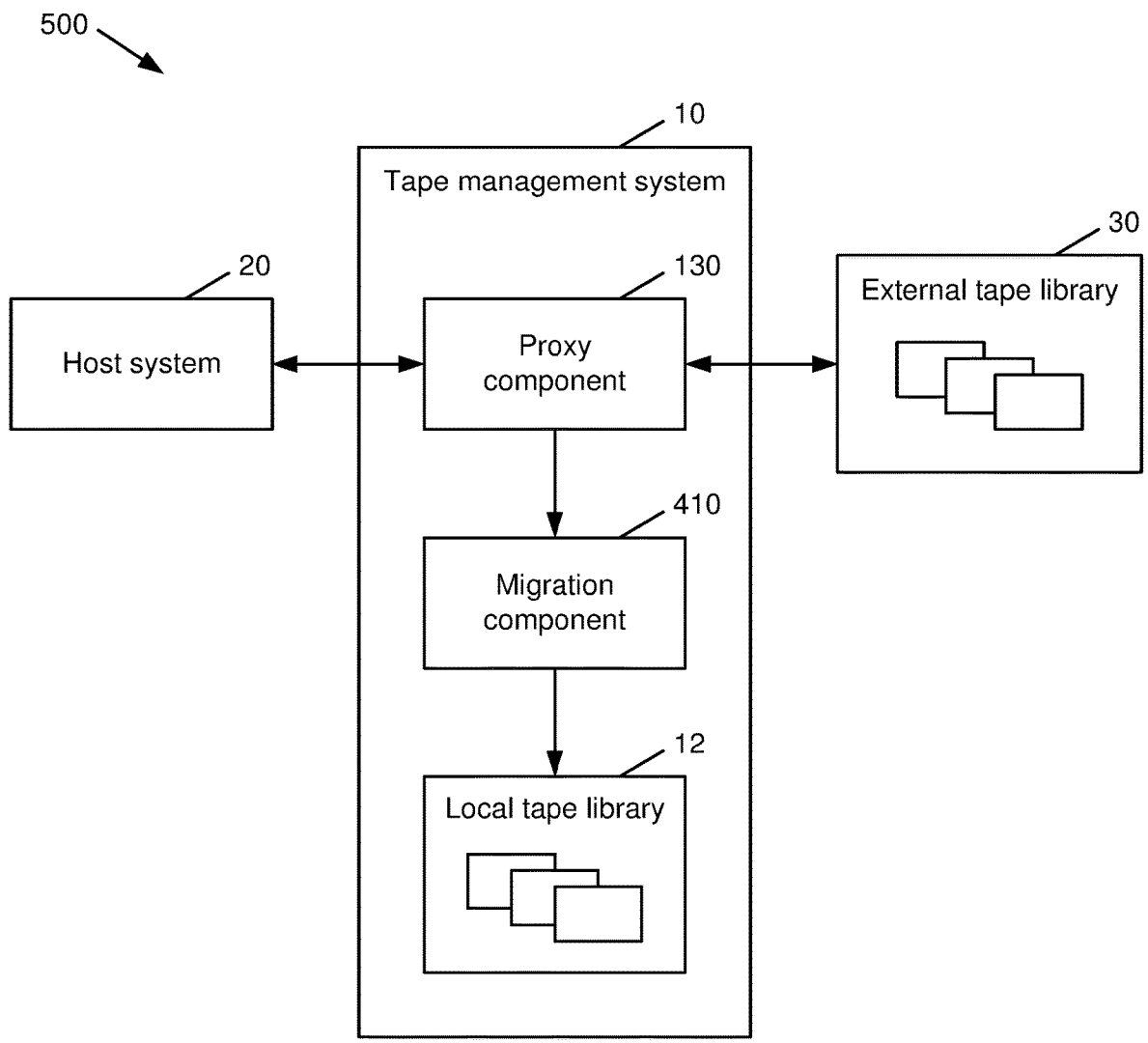
FIG. 5 is a block diagram of a system that facilitates data migration from an outside tape library to a local tape library based on communication activity with a host system in accordance with various aspects described herein.

With reference now to FIG. 5, a block diagram of a system 500 that facilitates data migration from an outside (external) tape library 30 to a local tape library 12 based on communication activity with a host system 20 in accordance with various aspects described herein is illustrated. Repetitive description of like elements employed in other embodiments described herein is omitted for brevity. As shown by FIG. 5, once connections have been established between the tape management system 10, the host system 20, and the external tape library 30 (e.g., by a connection component 110, not shown in FIG. 5), the proxy component 130 can utilize a same communication protocol to proxy commands between the host system 20 and the external tape library 30. In an aspect, the tape management system 10, via the proxy component 130, can leverage this common communication protocol to represent itself as a set of tape drives and/or other tape storage system to the host system 20 while representing itself as a mainframe and/or other host system to the external tape library 30. Accordingly, both the host system 20 and the external tape library 30 can interact with the tape management system 10 according to their existing operational procedures without reconfiguration of those systems for migration.

In an aspect, the proxy component 130 can initiate on-demand migration of one or more storage devices associated with the external tape library 30 to the local tape library 12 of the tape management system 10 via the migration component 410 in response to an access request for storage device(s) made by the host system 20. For instance, in response to the host system 20 mounting a tape and/or other storage device at the external tape library 30, the migration component 410, via the proxy component 130, can facilitate migration of that tape or other storage device to the local tape library 12. For instance, in response to a first access request from the host system 20 for a given storage device at the external tape library 30, the migration component 410, via the proxy component 130, can initiate migration of data stored on that storage device by transmitting a second access request for that storage device to the external tape library 30. This process is described in further detail below with respect to FIG. 9.

Figure 6:
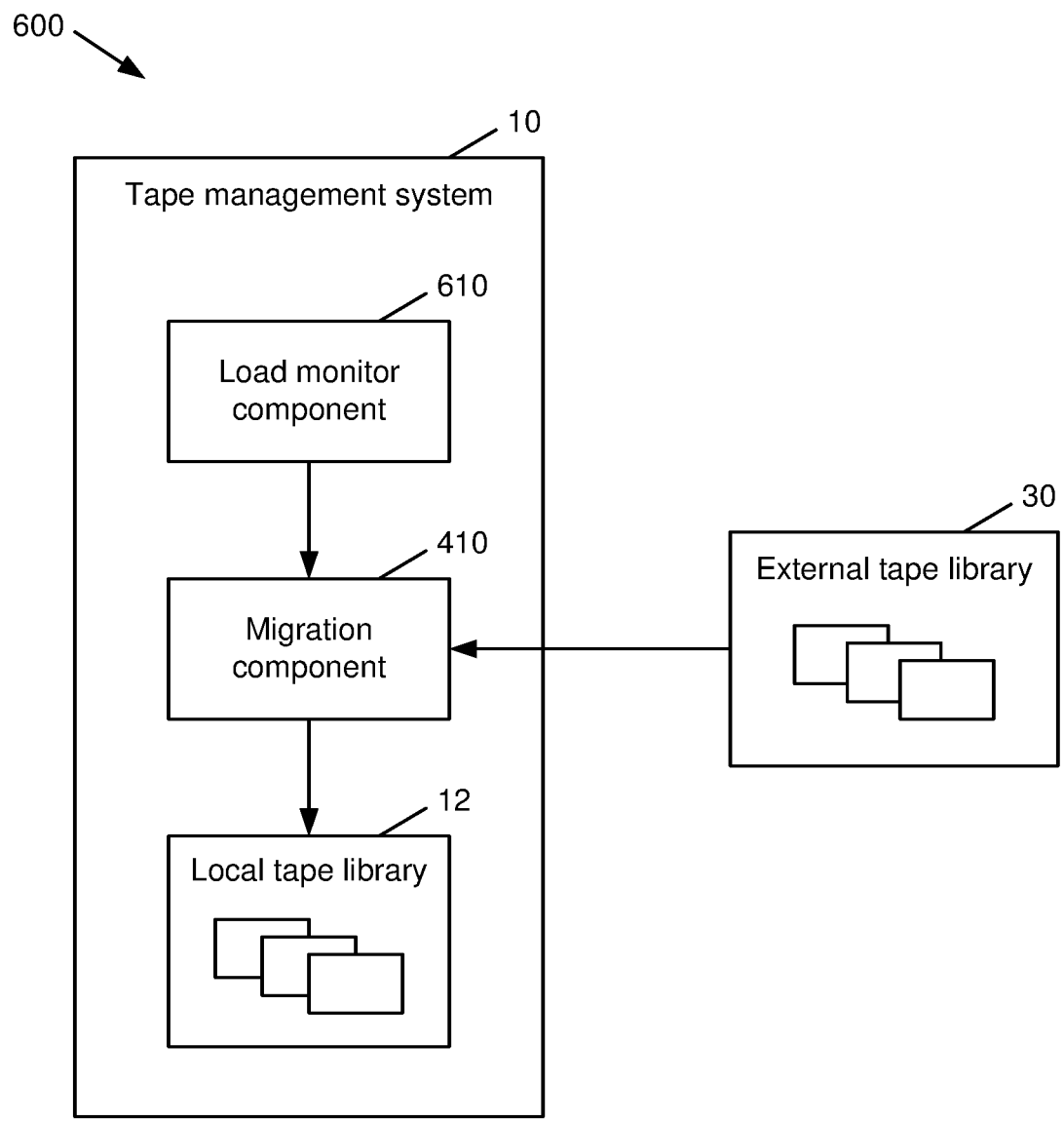
FIG. 6 is a block diagram of a system that facilitates data migration from an outside tape library to a local tape library based on a system load level in accordance with various aspects described herein.

Turning to FIG. 6, a block diagram of a system 600 that facilitates data migration from an outside tape library to a local tape library based on a system load level in accordance with various aspects described herein is illustrated. Repetitive description of like elements employed in other embodiments described herein is omitted for brevity. In contrast to on-demand migration as described above with respect to system 500, system 600 as shown in FIG. 6 can facilitate migration of data from the external tape library 30 to the local tape library 12 via the migration component 410 passively, e.g., according to a schedule and/or based on other parameters. In one example, the migration component 410 as shown in system 600 can be configured according to a schedule and/or timer to perform migration operations during off-peak times and/or other expected times of low system loading. As further shown by FIG. 6, the tape management system 10 shown in system 600 can include a load monitor component 610 that actively monitors a loading level of the host system 20, the external tape library 30, and/or the tape management system 10 itself. Based on this monitored load level, the migration component 410 can migrate data stored on respective storage devices of the external tape library 30 to respective storage devices of the local tape library 12, e.g., in response to a monitored loading level being determined to be below a threshold loading level.

In an aspect, data migration as performed by the migration component 410 in systems 400, 500, and/or 600 as described above can be performed as a background process relative to the host system 20. As a result, tapes and/or other storage devices associated with the external tape library 30 and/or the local tape library 12 can remain accessible to the host system 20 and its users even while those devices are being migrated between systems.

Figure 7:
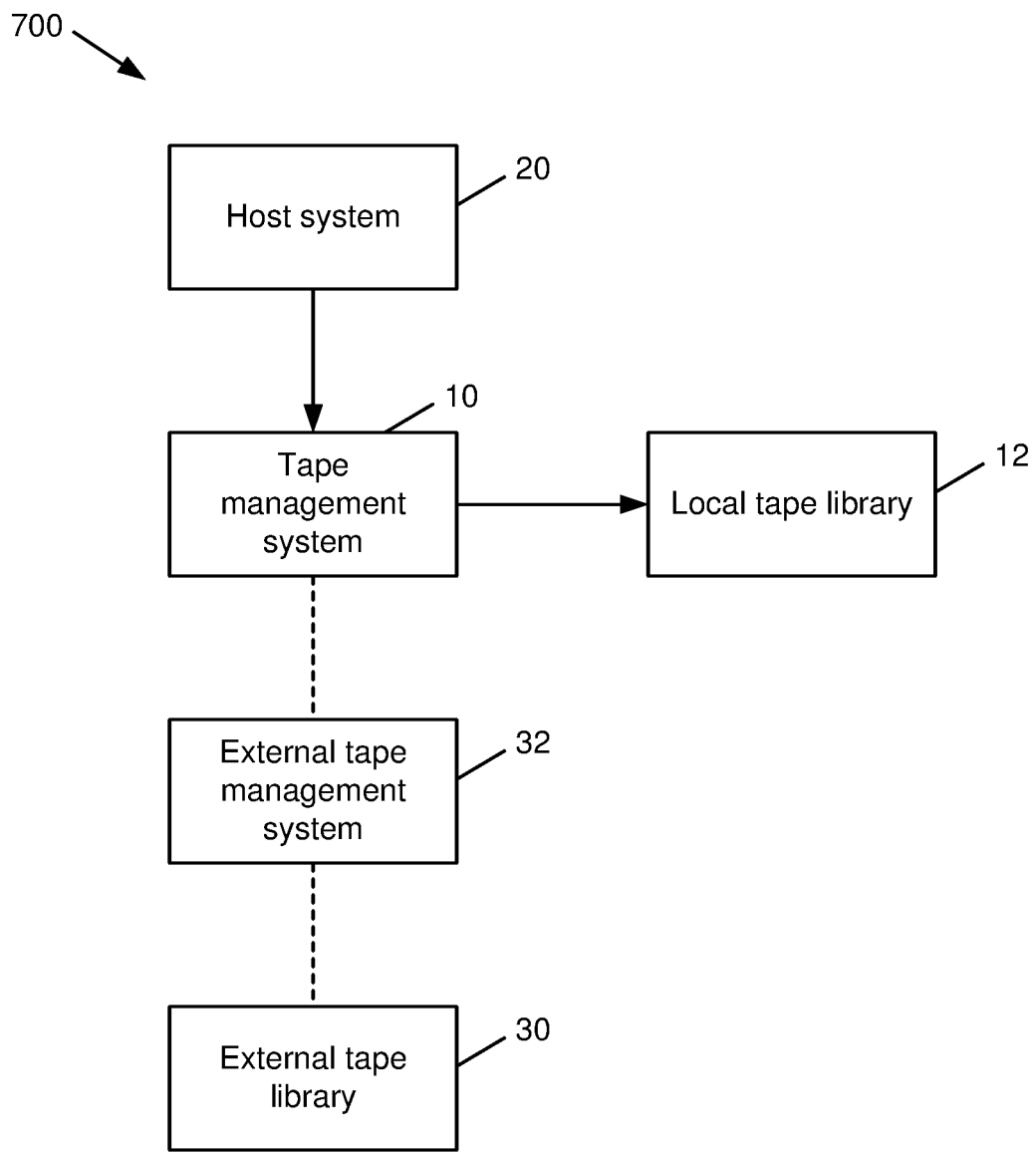
FIGS. 7-9 are diagrams depicting respective data access operations that can be performed between a host system and respective tape management systems in accordance with various aspects described herein.
Figure 8:
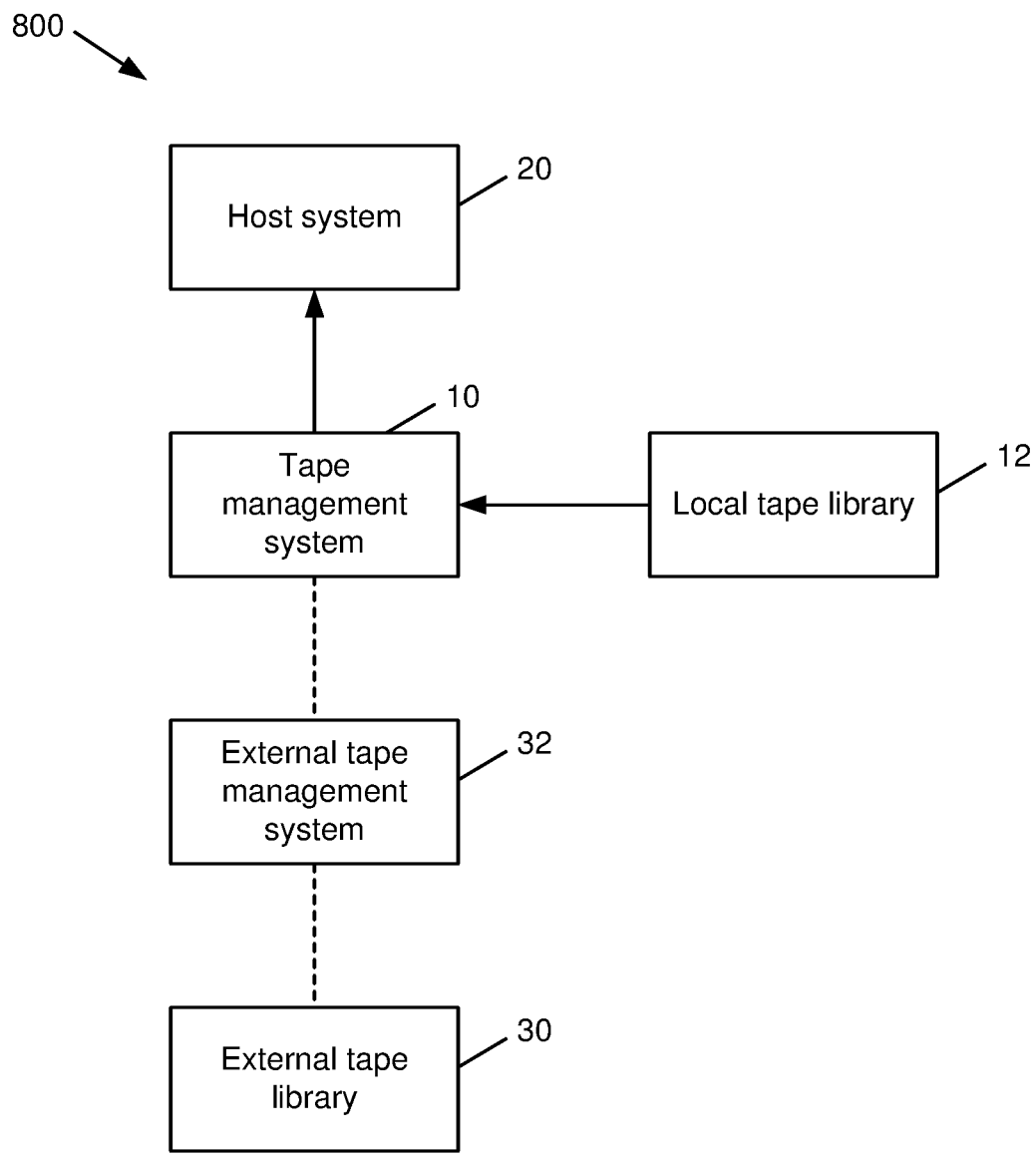
Figure 9:
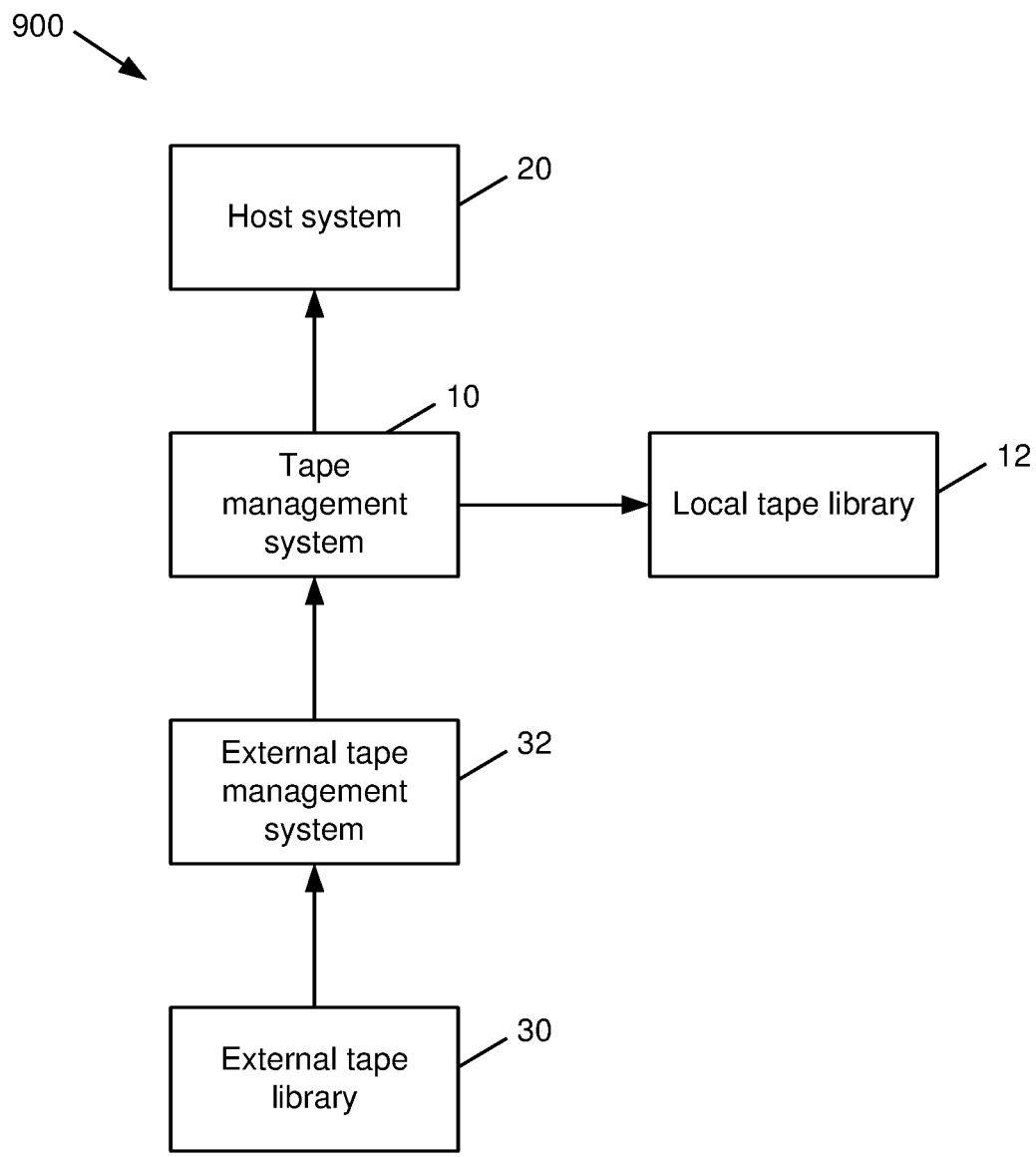

Referring now to FIGS. 7-9, diagrams are provided that illustrate respective data access operations that can be performed by a host system 20, a (local) tape management system 10, and/or an external (outside) tape management system 32 in accordance with various aspects as described herein. It should be appreciated, however, that the operations shown and described with respect to FIGS. 7-9 are merely an example subset of operations that could be performed, and other operations and/or operation flows are also possible.

With reference first to FIG. 7, diagram 700 illustrates an example operational flow that can be conducted in connection with writing to tapes or other storage devices associated with a host system 20. As shown in diagram 700, upon receiving a request by the host system 20 to write a new tape or storage device (e.g., via a first connection between a connection component 110 of the tape management system 10 and the host system 20 as shown by FIG. 1), the tape management system 10 can handle the write request by enabling write access by the host system 20 to one or more storage devices in the local tape library 12. In an aspect, the tape management system 10, e.g., via a proxy component 130 as shown in FIG. 1, can direct a write request by the host system 20 to the external tape management system 32 in addition to, or in place of, enabling write access to the local tape library 12. This may be done, for example, in scenarios where a system operator desires to continue utilizing the external tape management system 32 in addition to the tape management system 10 for some period of time, e.g., pending completion of migration to the local tape library 12.

Diagram 800 in FIG. 8 illustrates a similar operational flow that can be performed in response to a read request provided by the host system 20. As shown by diagram 800, the host system 20 can submit a read request for a storage device to the tape management system 10 (e.g., via a first connection between a connection component 110 of the tape management system 10 and the host system 20 as shown by FIG. 1). In response to this request, the tape management system 10 can determine whether the requested storage device is present within its associated local tape library 12. If, as shown by diagram 800, the storage device is determined to be present in the local tape library 12, the tape management system 10 can provide access to that storage device to the host system 20.

If, alternatively, the requested storage device is determined to be absent from the local tape library 12, the tape management system 10 can instead proxy the read request to the external tape management system 32 (e.g., via the proxy component 130 as described above with respect to FIG. 1) as shown by diagram 900 in FIG. 9. In an aspect, the proxy component 130 (not shown in FIG. 9) of the tape management system 10 can facilitate access to the requested storage device at the external tape library 30 by modifying the access request provided by the host system 20 to indicate the tape management system 10 as the requesting entity instead of the host system 20 and sending this modified access request to the external tape management system 32. In response, the external tape management system 32 can provide read access to the requested storage device at the external tape library 30 to the tape management system 10 using the same procedure the external tape management system 32 would use for providing said access to the host system 20 itself. The tape management system 10, in turn, can then act as a proxy for the external tape management system 32 to enable the host system 20 to access the requested storage device at the external tape library 30 from the tape management system 10 using the same procedure the host system 20 would use for accessing the storage device from the local tape library 12.

As further shown by FIG. 9, in combination with providing read access to a requested storage device located in the external tape library 30 via the tape management system 10, the tape management system 10 can also facilitate migration of the requested storage device to the local tape library 12 in combination with providing access to the storage device to the host system 20. In one example, this can be performed in the manner described above with respect to FIG. 5 for on-demand migration by the migration component 410 and the proxy component 130.

Figure 10:
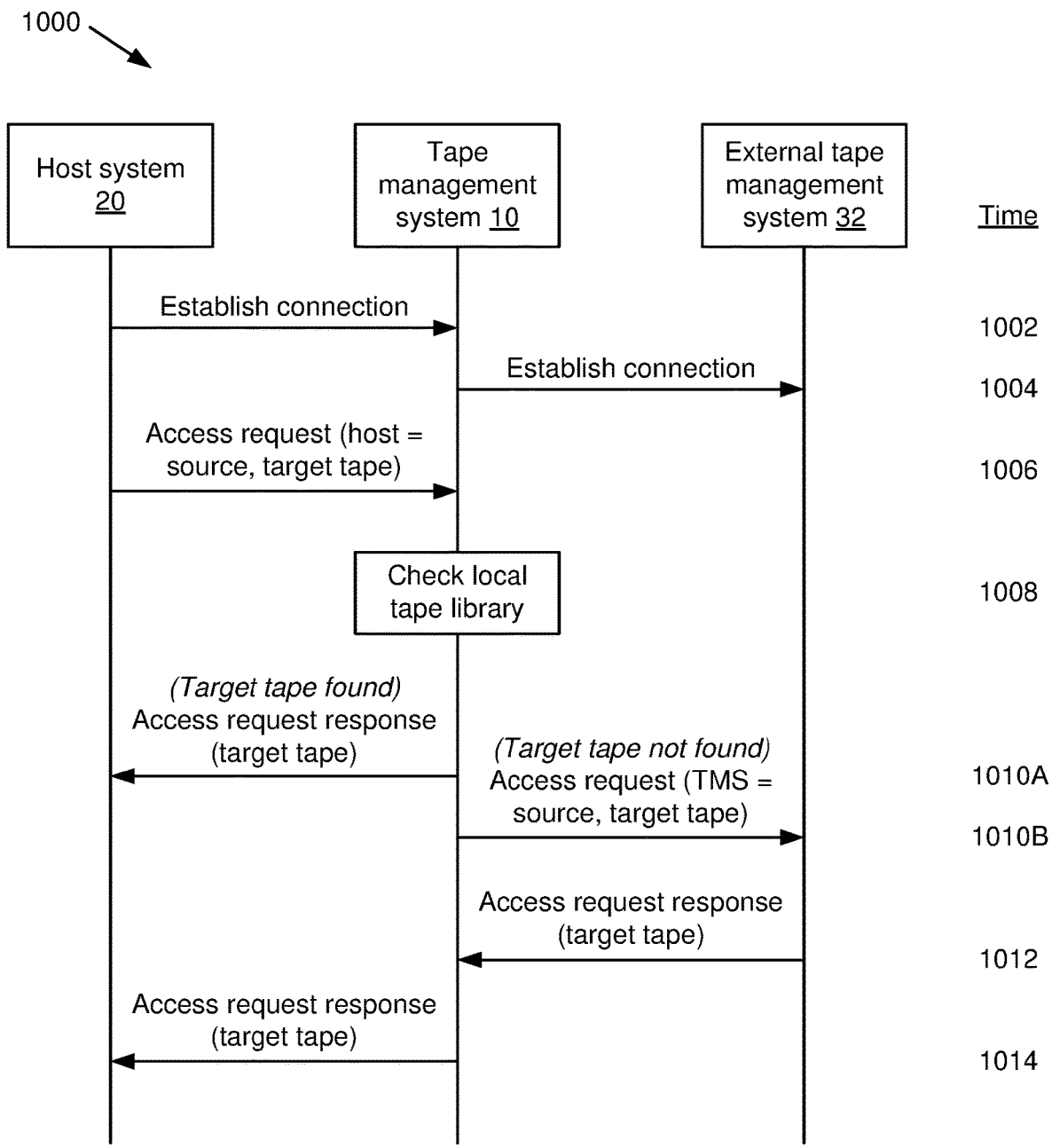
FIG. 10 is a diagram depicting an example messaging flow between a host system, a local tape management system, and an outside tape management system in accordance with various aspects described herein.

Turning now to FIG. 10, a diagram 1000 is provided that depicts an example messaging flow between a host system 20, a (local) tape management system 10, and an outside (external) tape management system 32 in accordance with various aspects described herein. While respective acts shown in diagram 1000 are described with reference to time, it should be appreciated that the timeline described below is provided merely for simplicity of explanation and that various acts depicted in diagram 1000 could occur in different orders than that shown in diagram 1000.

At times 1002 and 1004, the tape management system 10 can establish connections (e.g., via a connection component 110) with the host system 20 and the external tape management system 32, respectively. In an aspect, the connections established at times 1002 and 1004 can utilize a same communications protocol, such as the FICON protocol and/or other suitable protocols. Further, while the connections shown at times 1002 and 1004 are depicted as occurring at different points in time, it should be appreciated that both connections could be established simultaneously or near-simultaneously, and further that said connections could be established in any suitable order.

At time 1006, the host system 20 can submit an access request to the tape management system 10 for a given tape or other storage device. In an aspect, the access request can be a read request and/or a write request. As shown in diagram 1000, the access request can indicate the host system 20 as the source of the request and, if appropriate to the request (e.g., for a read request for a specific tape, etc.), an identifier associated with the target storage device.

At time 1008, the tape management system 10 can determine whether the storage device requested at time 1006, if specified, is present within the local tape library 12 associated with the tape management system 10. If the requested device is present in the local tape library 12, or if no specific device was requested at time 1006 (e.g., if a write request was received from the host system 20), the communication flow as depicted by diagram 1000 can conclude at time 1010A, where the tape management system 10 facilitates access to the requested storage device at the local tape library 12.

Alternatively, if the requested storage device is determined to be absent from the local tape library at time 1008, the communication flow can instead proceed as shown at time 1010B, where the tape management system 10 can (e.g., via the proxy component 130) forward the access request received at time 1006 to the external tape management system 32. In an aspect, the tape management system 10 can modify the access request prior to forwarding as shown at time 1010B by indicating itself as the source of the request instead of the host system 20. As a result, as shown at time 1012, the external tape management system 32 can provide a response to the access request that facilitates access to the requested storage device to the tape management system 10 in the same manner that the external tape management system 32 would facilitate access to the storage device by the host system 20. The tape management system 10 can then send a similar response to the host system 20 as shown at time 1014. Following time 1014, the tape management system 10 can proxy read/write commands between the host system 20 and the external tape management system 32 such that the host system 20 and the external tape management system 32 can communicate via the tape management system 10 as if those systems were directly connected to each other.

Figure 11:
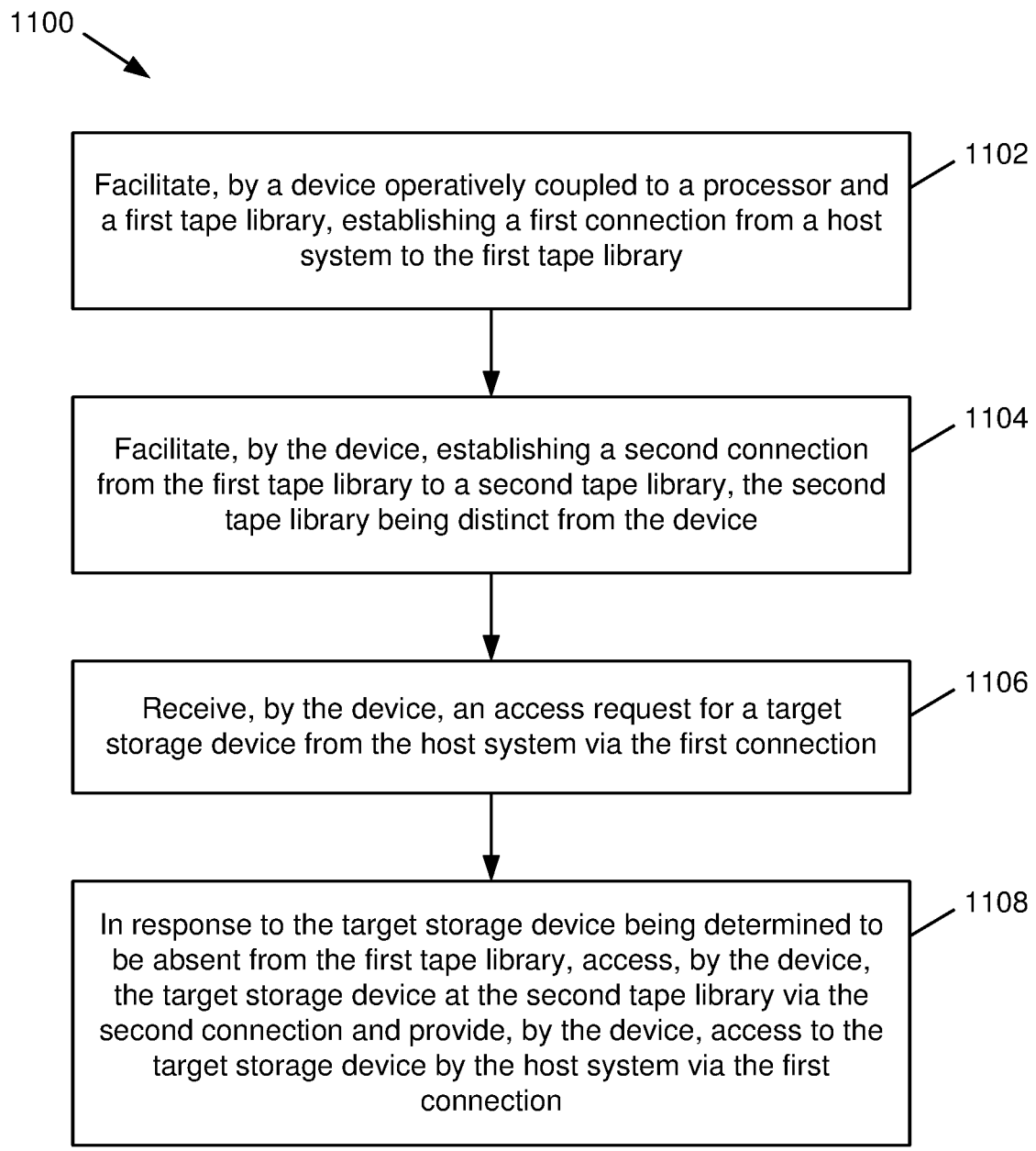
FIG. 11 is a flow diagram of a method that facilitates migration of data between virtual tape storage systems without host involvement in accordance with various aspects described herein.

Referring next to FIG. 11, a flow diagram of a method 1100 that facilitates migration of data between virtual tape storage systems without host involvement in accordance with various aspects described herein is illustrated. At 1102, a device (e.g., a device associated with a tape management system 10) operatively coupled to a processor and a first tape library (e.g., a local tape library 12) can facilitate (e.g., by a connection component 110) a first connection from a host system (e.g., a host system 20) to the first tape library.

At 1104, the device can facilitate (e.g., by the connection component 110) a second connection from the first tape library to a second tape library (e.g., an outside or external tape library 30) that is distinct from the first tape library.

At 1106, the device can receive (e.g., by a request processing component 120) an access request for a target storage device from the host system via the first connection established at 1102.

At 1108, in response to the target storage device indicated at 1106 being determined to be absent from the first tape library, the device can access (e.g., by a proxy component 130) the target storage device at the second tape library via the second connection as established at 1104 and provide access to the target storage device by the host device via the first connection established at 1102.

FIG. 11 as described above illustrates a method in accordance with certain aspects of this disclosure. While, for purposes of simplicity of explanation, the method has been shown and described as series of acts, it is to be understood and appreciated that this disclosure is not limited by the order of acts, as some acts may occur in different orders and/or concurrently with other acts from that shown and described herein. For example, those skilled in the art will understand and appreciate that methods can alternatively be represented as a series of interrelated states or events, such as in a state diagram. Moreover, not all illustrated acts may be required to implement methods in accordance with certain aspects of this disclosure.

Figure 12:
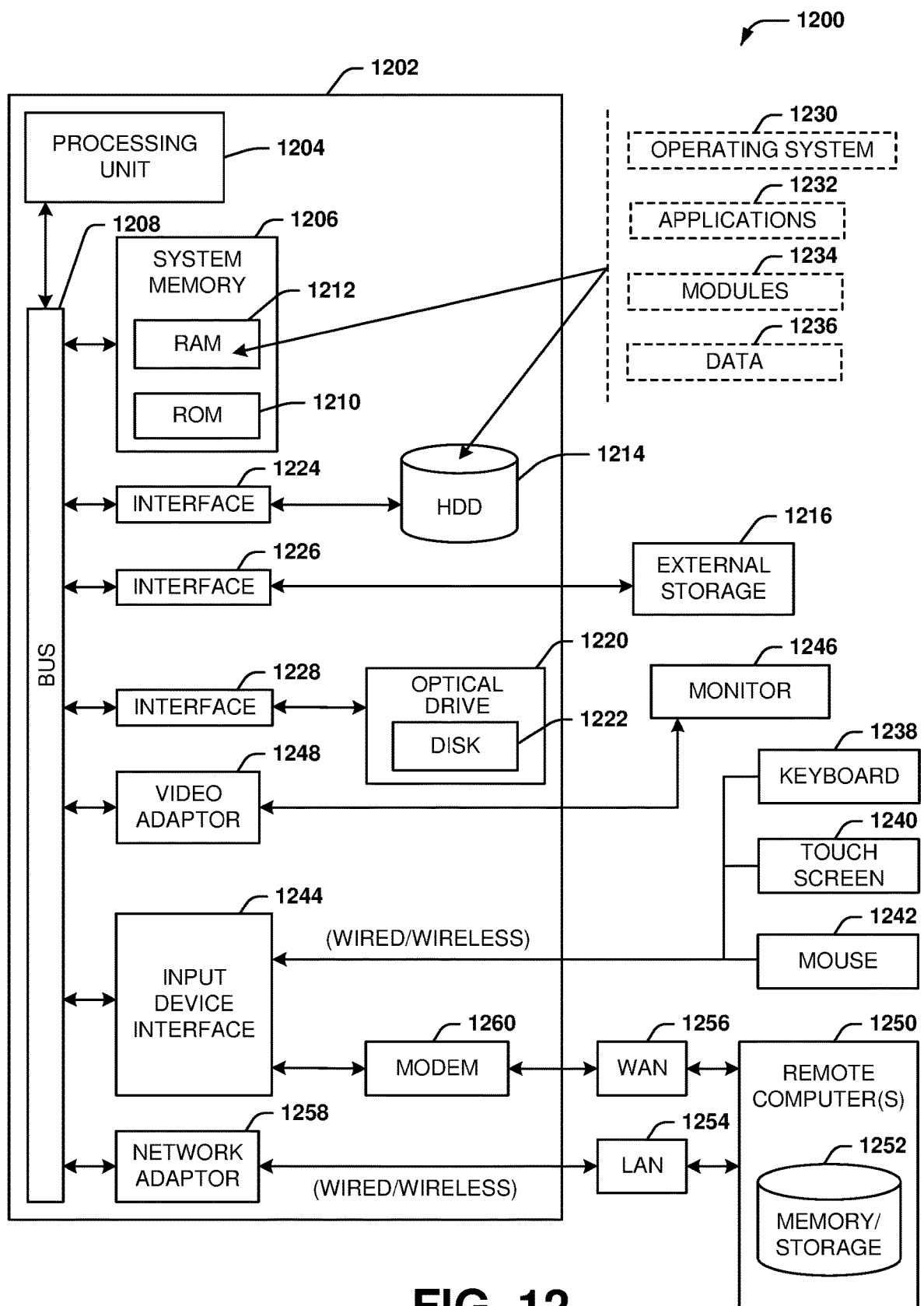
FIG. 12 is a diagram of an example computing environment in which various embodiments described herein can function.

In order to provide additional context for various embodiments described herein, FIG. 12 and the following discussion are intended to provide a brief, general description of a suitable computing environment 1200 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 12, the example environment 1200 for implementing various embodiments of the aspects described herein includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi-processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes ROM 1210 and RAM 1212. A basic input/output system (BIOS) can be stored in a non-volatile memory such as ROM, erasable programmable read only memory (EPROM), EEPROM, which BIOS contains the basic routines that help to transfer information between elements within the computer 1202, such as during startup. The RAM 1212 can also include a high-speed RAM such as static RAM for caching data.

The computer 1202 further includes an internal hard disk drive (HDD) 1214 (e.g., EIDE, SATA), one or more external storage devices 1216 (e.g., a magnetic floppy disk drive (FDD) 1216, a memory stick or flash drive reader, a memory card reader, etc.) and an optical disk drive 1220 (e.g., which can read or write from a CD-ROM disc, a DVD, a BD, etc.). While the internal HDD 1214 is illustrated as located within the computer 1202, the internal HDD 1214 can also be configured for external use in a suitable chassis (not shown). Additionally, while not shown in environment 1200, a solid state drive (SSD) could be used in addition to, or in place of, an HDD 1214. The HDD 1214, external storage device(s) 1216 and optical disk drive 1220 can be connected to the system bus 1208 by an HDD interface 1224, an external storage interface 1226 and an optical drive interface 1228, respectively. The interface 1224 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1202, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. The systems and methods described herein can be implemented utilizing various commercially available operating systems or combinations of operating systems.

Computer 1202 can optionally comprise emulation technologies. For example, a hypervisor (not shown) or other intermediary can emulate a hardware environment for operating system 1230, and the emulated hardware can optionally be different from the hardware illustrated in FIG. 12. In such an embodiment, operating system 1230 can comprise one virtual machine (VM) of multiple VMs hosted at computer 1202. Furthermore, operating system 1230 can provide runtime environments, such as the Java runtime environment or the .NET framework, for applications 1232. Runtime environments are consistent execution environments that allow applications 1232 to run on any operating system that includes the runtime environment. Similarly, operating system 1230 can support containers, and applications 1232 can be in the form of containers, which are lightweight, standalone, executable packages of software that include, e.g., code, runtime, system tools, system libraries and settings for an application.

Further, computer 1202 can be enable with a security module, such as a trusted processing module (TPM). For instance with a TPM, boot components hash next in time boot components, and wait for a match of results to secured values, before loading a next boot component. This process can take place at any layer in the code execution stack of computer 1202, e.g., applied at the application execution level or at the operating system (OS) kernel level, thereby enabling security at any level of code execution.

A user can enter commands and information into the computer 1202 through one or more wired/wireless input devices, e.g., a keyboard 1238, a touch screen 1240, and a pointing device, such as a mouse 1242. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1204 through an input device interface 1244 that can be coupled to the system bus 1208, but can be connected by other interfaces, such as a parallel port, an IEEE 1394 serial port, a game port, a USB port, an IR interface, a BLUETOOTH® interface, etc.

A monitor 1246 or other type of display device can be also connected to the system bus 1208 via an interface, such as a video adapter 1248. In addition to the monitor 1246, a computer typically includes other peripheral output devices (not shown), such as speakers, printers, etc.

The computer 1202 can operate in a networked environment using logical connections via wired and/or wireless communications to one or more remote computers, such as a remote computer(s) 1250. The remote computer(s) 1250 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1252 is illustrated. The logical connections depicted include wired/wireless connectivity to a local area network (LAN) 1254 and/or larger networks, e.g., a wide area network (WAN) 1256. Such LAN and WAN networking environments are commonplace in offices and companies, and facilitate enterprise-wide computer networks, such as intranets, all of which can connect to a global communications network, e.g., the Internet.

When used in a LAN networking environment, the computer 1202 can be connected to the local network 1254 through a wired and/or wireless communication network interface or adapter 1258. The adapter 1258 can facilitate wired or wireless communication to the LAN 1254, which can also include a wireless access point (AP) disposed thereon for communicating with the adapter 1258 in a wireless mode.

When used in a WAN networking environment, the computer 1202 can include a modem 1260 or can be connected to a communications server on the WAN 1256 via other means for establishing communications over the WAN 1256, such as by way of the Internet. The modem 1260, which can be internal or external and a wired or wireless device, can be connected to the system bus 1208 via the input device interface 1244. In a networked environment, program modules depicted relative to the computer 1202 or portions thereof, can be stored in the remote memory/storage device 1252. It will be appreciated that the network connections shown are example and other means of establishing a communications link between the computers can be used.

When used in either a LAN or WAN networking environment, the computer 1202 can access cloud storage systems or other network-based storage systems in addition to, or in place of, external storage devices 1216 as described above. Generally, a connection between the computer 1202 and a cloud storage system can be established over a LAN 1254 or WAN 1256 e.g., by the adapter 1258 or modem 1260, respectively. Upon connecting the computer 1202 to an associated cloud storage system, the external storage interface 1226 can, with the aid of the adapter 1258 and/or modem 1260, manage storage provided by the cloud storage system as it would other types of external storage. For instance, the external storage interface 1226 can be configured to provide access to cloud storage sources as if those sources were physically connected to the computer 1202.

The computer 1202 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A tape management system, comprising:
a local tape library comprising respective storage devices;
a memory that stores executable components; and a processor that executes the executable components stored in the memory, wherein the executable components comprise:
    a connection component that establishes a first connection to a first host system via a first direct physical coupling between the tape management system and the first host system and further establishes a second connection to an outside tape library via a second direct physical coupling between the tape management system and an external tape management system, distinct from the tape management system, for the outside tape library and a third direct physical coupling between the external tape management system and the outside tape library, wherein the first host system and the external tape management system are not directly physically coupled;
    a request processing component that receives an access request for a requested storage device from the first host system via the first connection, the access request comprising a first identifier that indicates the first host system as a requesting system; and
    a proxy component that modifies the first identifier of the access request to indicate the tape management system as the requesting system, instead of the first host system, and represents, in the access request, the tape management system as a second host system, instead of as the tape management system, resulting in a modified access request, and accesses the requested storage device at the outside tape library by transmitting the modified access request to the outside tape library via the second connection, resulting in the proxy component enabling access to the requested storage device by the first host system via the first connection in response to the requested storage device being determined to be absent from the local tape library.

2. The tape management system of claim 1, wherein the respective storage devices of the local tape library are respective first storage devices, and wherein the executable components further comprise:
    a migration component that migrates data stored on respective second storage devices of the outside tape library to the respective first storage devices of the local tape library.

3. The tape management system of claim 2, wherein the migration component migrates data stored on the requested storage device to a first storage device of the local tape library in response to the proxy component accessing the requested storage device at the outside tape library.

4. The tape management system of claim 2, wherein the executable components further comprise:
    a load monitor component that monitors a loading level of the first host system, wherein the migration component migrates the data stored on the respective second storage devices of the outside tape library to the respective first storage devices of the local tape library in response to the loading level of the first host system being determined to be below a threshold.

5. The tape management system of claim 4, wherein the access request is a first access request, and wherein the migration component initiates migration of the data stored on the respective second storage devices of the outside tape library by transmitting a second access request for the respective second storage devices to the outside tape library via the second connection.

6. The tape management system of claim 1, wherein the first connection and the second connection utilize a same communication protocol.

7. The tape management system of claim 1, wherein the second direct physical coupling between the tape management system and the external tape management system comprises a wired connection between the tape management system and the external tape management system.

8. The tape management system of claim 7, wherein the wired connection between the tape management system and the external tape management system operates according to a Fibre Channel protocol.

9. The tape management system of claim 1, wherein the access request further comprises a second identifier that corresponds to the requested storage device.

10. A method, comprising:
    facilitating, by a device operatively coupled to a processor and a first tape library, establishing a first connection from a first host system to the first tape library via a first direct physical coupling between the first host system and the device and a second direct physical coupling between the device and the first tape library;
    facilitating, by the device, establishing a second connection from the first tape library to a second tape library via a third direct physical coupling between the device and an external tape management system for the second tape library and a fourth direct physical coupling between the external tape management system and the second tape library, wherein the external tape management system is distinct from the device, and wherein the first host system and the external tape management system are not directly physically coupled;
    receiving, by the device, an access request for a target storage device from the first host system via the first connection, wherein the access request comprises a first identifier that indicates the host system as a requesting system;
    modifying, by the device, the access request by modifying the first identifier of the access request to indicate the device as the requesting system, instead of the first host system, and to represent the device as a second host system, instead of as the device, wherein the modifying results in a modified access request; and
    in response to the target storage device being determined to be absent from the first tape library, accessing, by the device, the target storage device at the second tape library by transmitting the modified access request to the second tape library via the second connection and providing, by the device, access to the target storage device by the first host system via the first connection.

11. The method of claim 10, wherein the first tape library comprises respective first storage devices, and wherein the method further comprises:
    migrating, by the device, data stored on respective second storage devices of the second tape library to the respective first storage devices of the first tape library.

12. The method of claim 11, wherein the migrating comprises migrating data stored on the target storage device from the second tape library to a first storage device of the first tape library in response to the accessing the target storage device at the second tape library.

13. The method of claim 11, further comprising:
    tracking, by the device, a loading level of the first host system, wherein the migrating comprises migrating the data stored on the respective second storage devices of the second tape library to the respective first storage devices of the first tape library in response to the loading level of the first host system being determined to be below a threshold.

14. The method of claim 13, wherein the access request is a first access request, and wherein the method further comprises:
    initiating, by the device, the migrating by transmitting a second access request for the respective second storage devices to the second tape library via the second connection.

15. The method of claim 10, wherein the access request further comprises a second identifier for the target storage device.

16. A non-transitory machine-readable medium comprising computer executable instructions that, when executed by a processor of a data storage system, facilitate performance of operations, the operations comprising:
    establishing a first connection from a first mainframe system to a local tape library via a first direct physical coupling between the first mainframe system and a first tape management system for the local tape library and a second direct physical coupling between the first tape management system and the local tape library;
    establishing a second connection from the local tape library to an external tape library via a third direct physical coupling between the local tape library and a second tape management system, distinct from the first tape management system, for the external tape library and a fourth direct physical coupling between the second tape management system and the external tape library, wherein the first mainframe system and the second tape management system are not directly physically coupled;
    receiving a request for access to a requested storage device from the first mainframe system via the first connection, wherein the request comprises a first identifier that indicates the mainframe system as a request originator;
    modifying the request by modifying the first identifier of the request to indicate the local tape library as the request originator, instead of the mainframe system, and to represent the local tape library as a second mainframe system, instead of as the local tape library, resulting in a modified request; and
    in response to the requested storage device being determined to be absent from the local tape library, accessing the requested storage device at the external tape library by transmitting the modified request to the external tape library via the second connection and facilitating access to the requested storage device by the mainframe system via the first connection.

17. The non-transitory machine-readable medium of claim 16, wherein the local tape library comprises respective first storage devices, and wherein the operations further comprise:
    migrating data stored on respective second storage devices of the external tape library to the respective first storage devices of the local tape library.

18. The non-transitory machine-readable medium of claim 17, wherein the operations further comprise:
    migrating data stored on the requested storage device from the external tape library to a first storage device of the local tape library in response to the accessing the requested storage device at the external tape library.

19. The non-transitory machine-readable medium of claim 17, wherein the operations further comprise:
    monitoring a load level of the first mainframe system; and
    migrating the data stored on the respective second storage devices of the external tape library to the respective first storage devices of the local tape library in response to the load level of the first mainframe system being determined to be below a threshold.

20. The non-transitory machine-readable medium of claim 17, wherein the request is a first request, and wherein the operations further comprise:
    initiating the migrating by transmitting a second request for access to the respective second storage devices to the external tape library via the second connection.

\* \* \* \* \*